Patented Jan. 16, 1923.

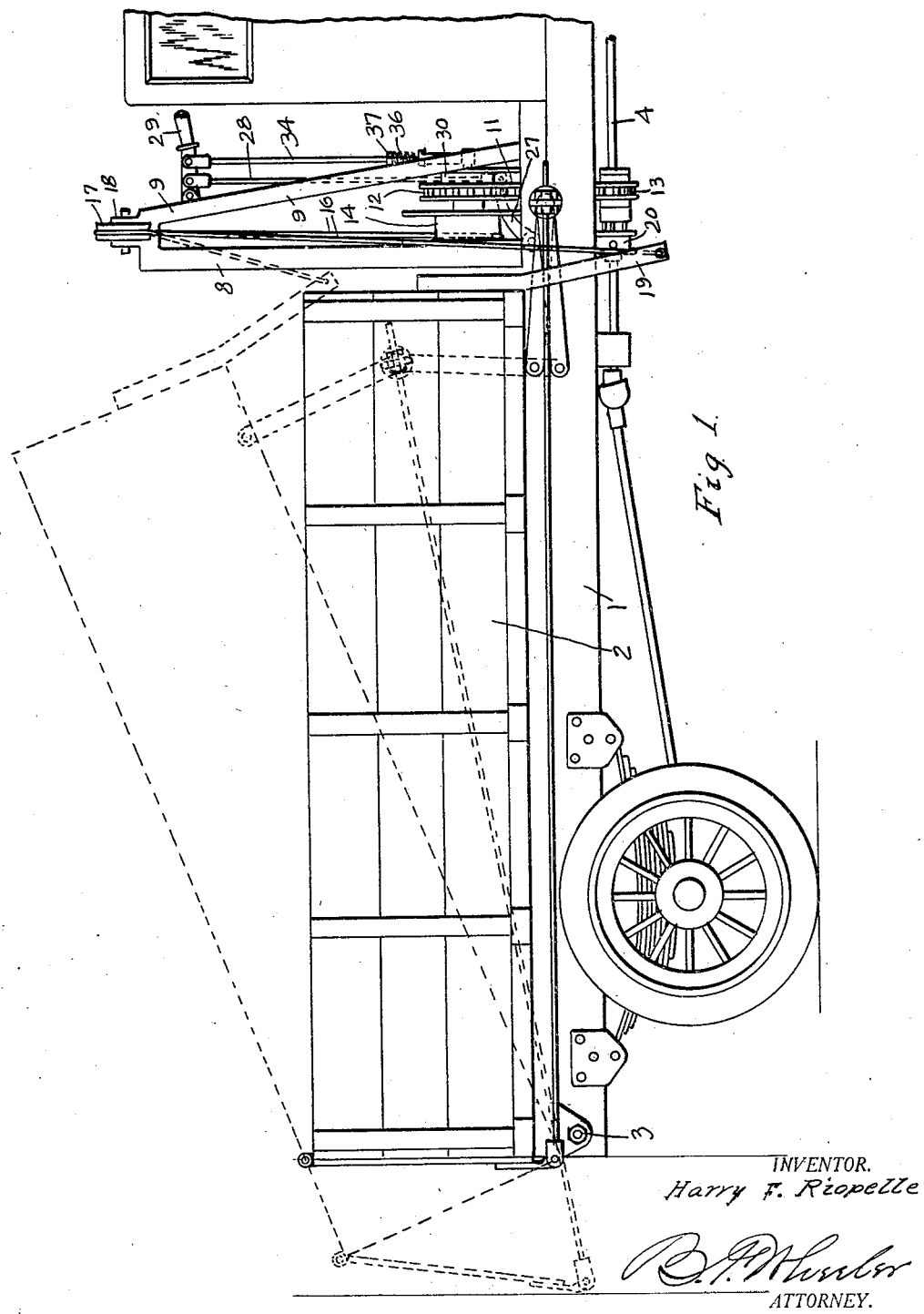

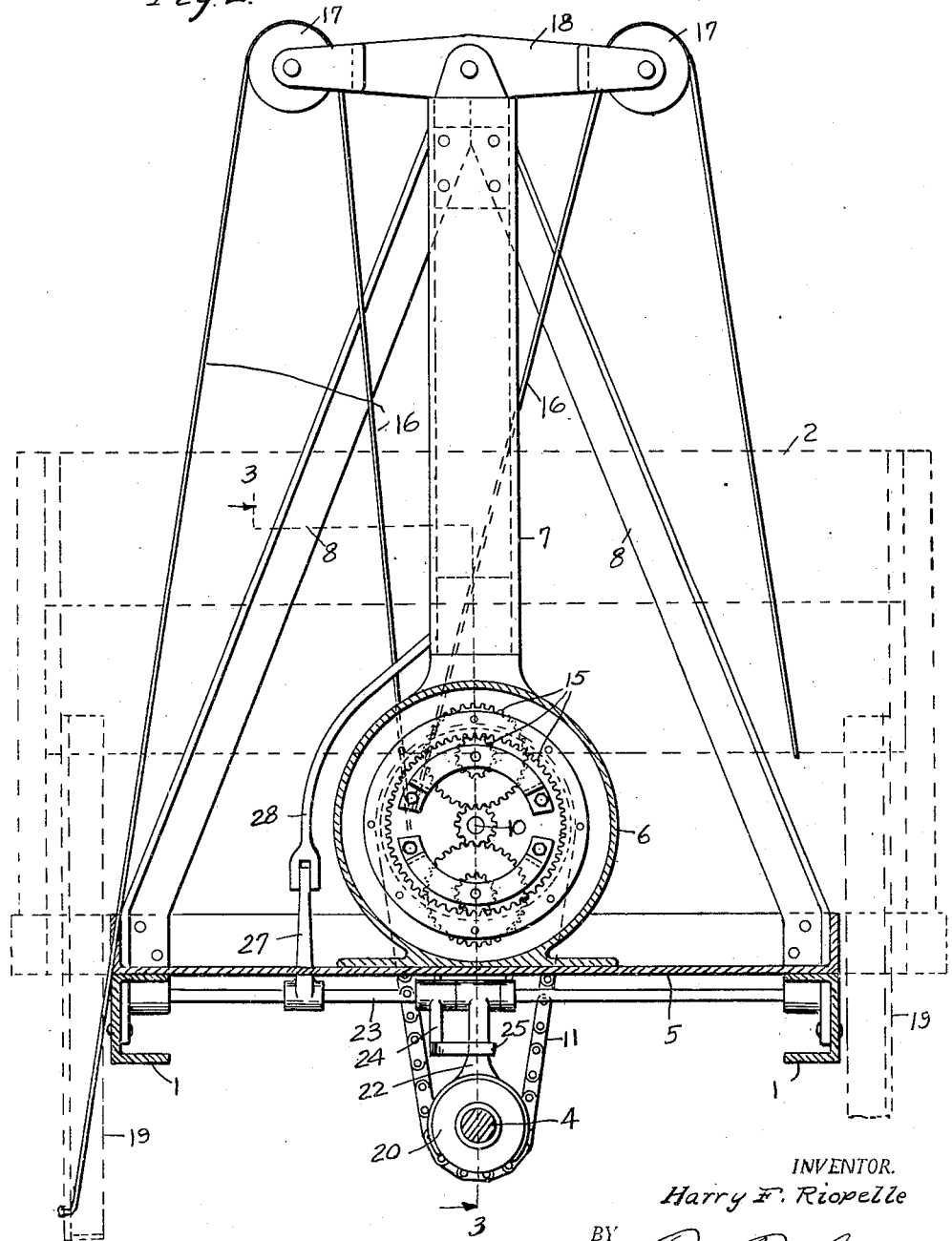

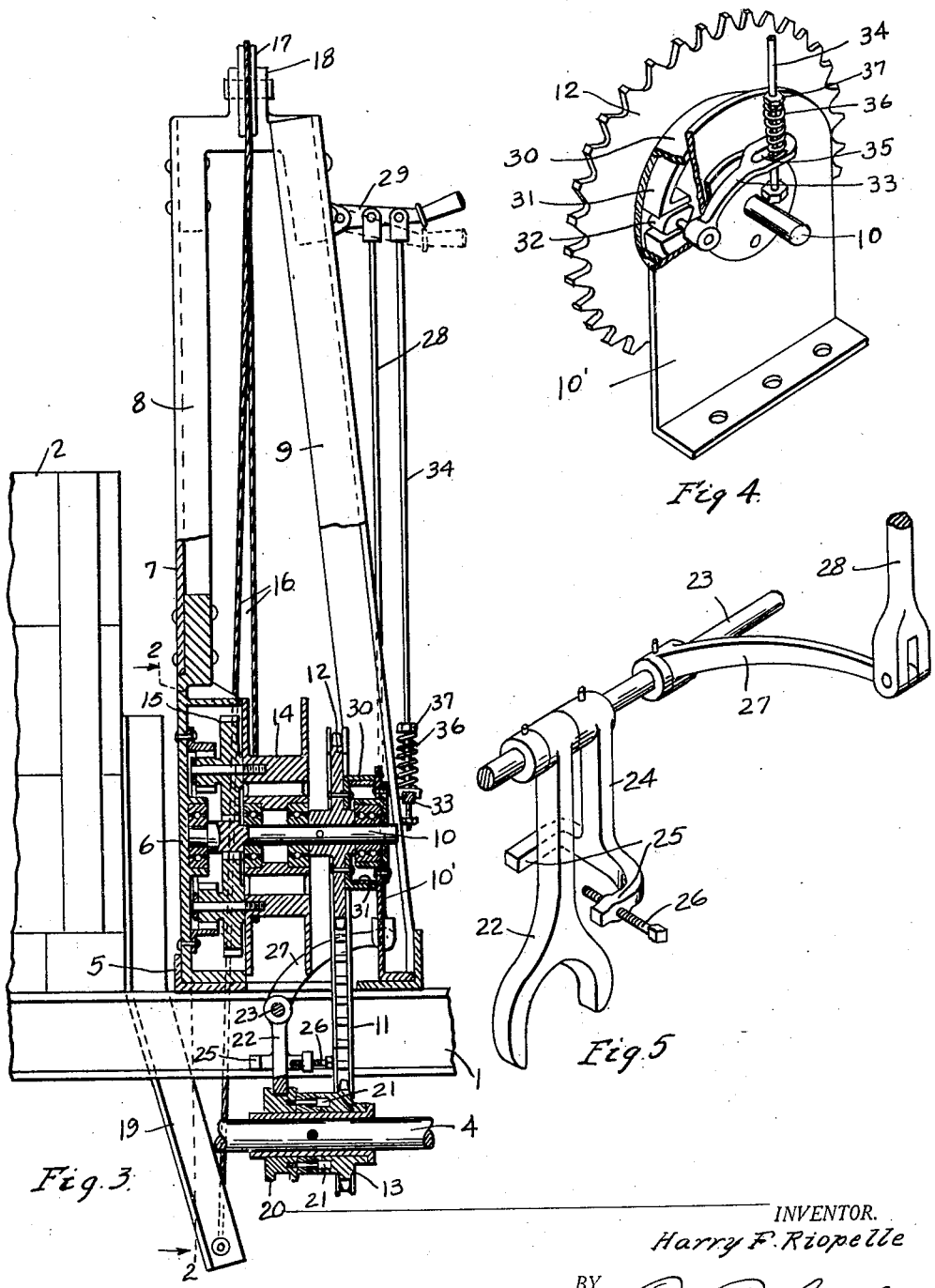

1,442,095

UNITED STATES PATENT OFFICE.

HARRY F. RIOPELLE, OF ECORSE, MICHIGAN.

DUMPING HOIST FOR MOTOR VEHICLES.

Application filed March 5, 1921. Serial No. 449,753.

*To all whom it may concern:*

Be it known that I, HARRY F. RIOPELLE, a citizen of the United States, residing at Ecorse, in the county of Wayne and State of Michigan, have invented a new and useful Dumping Hoist for Motor Vehicles, of which the following is a specification.

This invention relates to hoist mechanisms for dump trucks, and more particularly to mechanisms actuable by the main drive shaft of a motor truck for hoisting the load box of said truck to dumping position.

It is the object of the invention to provide a clutch controlling the drive to the hoist mechanism of a motor truck and a brake controlling said mechanism to maintain the raised position of the load box, and to provide a common control means for said clutch and brake such that a continuous movement of said actuating member first breaks the driving connection through the clutch and then applies the brake to maintain the raised position of the load box while its contents are discharging.

A further object of the invention is to provide for a certain lost motion in the actuating connection for the clutch, so that when the load box is to be lowered the brake may be released by said common actuating member without shifting the clutch from its non-drive position.

A preferred embodiment of the invention is illustrated in the accompanying drawing, wherein, Fig. 1 is a view in side elevation of a motor dump truck equipped with said hoist mechanism. the normal lowered position of the load box being shown in full lines and the raised position in dash lines.

Fig. 2 is a cross section taken on line 2—2 of Fig. 3, showing the hoist mechanism.

Fig. 3 is an elevation of said mechanism, partially in section, the plane of section being indicated at 3—3 in Fig. 2.

Fig. 4 is a perspective view of the brake mechanism for the hoist.

Fig. 5 is a detail perspective view of the clutch control mechanism.

In these views the reference character 1 designates the frame of a motor dump truck, 2 the load box of said truck pivoted at its rear end upon said frame as indicated at 3, and 4 is the drive shaft of the truck driven by the motor thereof (not shown). A cross bar 5 extending between the side rails of the frame supports a circular gear casing 6, which casing is surmounted by a standard 7 braced by members 8 inclining from the upper end of said standard to said side rails of the frame. A third inclined brace member 9 extends forwardly from the top of said standard to the frame 1. 10 is a shaft counter to the drive shaft 4, journaled at its rear end axially in the casing 6 and at its forward end in a bracket 10' mounted upon the frame. Said counter-shaft is adapted to be driven from the shaft 4 through a chain 11 mounted upon sprocket wheels 12 and 13, the former fast upon the counter-shaft and the latter loose upon said drive shaft. Intermediate the sprocket wheel 12 and casing 6 a drum 14 is loosely mounted upon the counter-shaft 10 and is adapted to be driven from the counter-shaft through a train of planetary reduction gearing 15 such as will insure a moderate speed for said drum. Two cables 16 are secured to the periphery of said drum to be wound thereupon, said cables extending upwardly respectively to pulleys 17 mounted upon the ends of an equalizing bar 18 centrally pivotally mounted upon the upper end of the standard 7. After passing over said pulleys the cables 16 are extended downwardly and respectively terminally secured to arms 19 rigidly depending from the forward end of the box 2 at each side thereof. Thus it is seen that when a drive is established to the drum 14 through the chain 11 and reduction gearing 15, said cables 16 will be wound upon said drum and the forward end of the load box will be raised. For establishing or discontinuing this drive, there is provided upon the shaft 4 a sliding clutch collar 20 carrying headed pins 21 engageable in sockets of the loose sprocket wheel 13 to make said wheel fast upon said shaft. Said collar is annularly grooved for engagement by a forked control arm 22 hung loosely upon a rock-shaft 23. A lost motion actuating means for said arm is formed by an adjacent arm 24 mounted fast upon said rock-shaft and having a bifurcated lower end. the furcations 25 of which project laterally, one at each side of the control arm 22, and one of said furcations carrying an adjusting screw 26 for regulating the amount of lost motion. The rock-shaft 23 further carries an actuating arm 27 from which a control rod 28 is extended upwardly to a handle 29 pivoted upon the upper end portion of the brace member 9. To the sprocket wheel 12 there is secured a brake drum 30 engageable interiorly by a brake band 31 expansible by means of a rocker cam 32. Said cam is fast upon a rocker shaft journaled in the bearing plate 10' and further carrying the actuating arm 33. From said arm a control rod 34 is extended upwardly and attached in common with the rod 28 to the control handle 29. Said rod passes freely through a slot 35 in the end of said arm 33 and is adapted to act upon said arm through a coiled spring 36 interposed between said arm and a nut 37 fast upon said shaft a short distance above said arm.

Considering now the operation of the described mechanism, when it is desired to hoist the load-box to dumping position the operator swings the handle 29 to the raised position which it occupies in the drawings. The resulting pull exerted through the rod 28 upon the arm 27 rocks the shaft 23 and after taking up of the lost motion between the arms 24 and 22 the clutch collar 20 is shifted to engage its drive pins 21 with the sprocket wheel 13. A drive is thus established to the countershaft 10 through the chain 11, and the drum 14 is driven from the countershaft through the reduction gearing 15. The cables 16, winding upon said drum, raises the forward end of the load-box, any tendency toward differential stresses in the two cables being overcome automatically by a swinging of the equalizing bar 18. The rod 34 is also shifted upwardly when the handle 29 is adjusted to the position shown in the drawing, but said rod moves freely through the arm 33 during this movement without rocking said arm, and without altering the normal contracted condition of the brake band 31. When the load-box has been shifted to the desired inclination, the handle 29 is swung to its lower limiting position, acting through the rod 28, arm 27, rock-shaft 23, and arms 24 and 22 to shift the clutch member 20 rearwardly to disengage it from the sprocket wheel 13 and discontinue the drive to the drum 14. While the rod 28 is shifting the clutch member 20 as just described, the rod 34 is also being downwardly shifted, the effect being merely to take up lost motion, however, without affecting the brake band 31. Continued downward swinging of the lever 29 stresses the spring 36 and exerts such a pressure through the rod 34 upon the arm 33 as to rock the cam 32 and expand the brake band. The latter, gripping the drum 30 prevents reverse rotation of the drum 14 and unwinding of the cables 16, so that the elevated position of the load-box is maintained while its contents are discharging. When the operator is ready to again lower said box, the handle 29 is raised to an intermediate position, in which position the braking pressure is sufficiently relieved to allow the box 2 to gradually fall to its normal position. The upward swinging of the lever 29 which effects a lowering of the load-box does not shift the clutch member 20 from its non-driving position, but merely rocks the shaft 23 sufficiently to take up the lost motion between the arms 24 and 22. The handle 29, when released, maintains said intermediate position in which no drive is established through said clutch and no braking pressure is applied.

The described hoisting mechanism is adapted to be controlled in a very simple manner and with a minimum exertion on the part of the driver. Said mechanism furthermore is one that permits raising of the load-box, discharge of the load and return of said box to its normal position within a minimum time.

What I claim is:

1. In a hoist mechanism of the character described, the combination with the frame and pivotal load-box of a motor dump truck, of a drive shaft, a counter-shaft, and a drive connection from the drive shaft to said countershaft, means operable for hoisting the load-box by said countershaft, a clutch controlling said drive connection, a brake for restraining the countershaft, and a common control lever for actuating said brake and clutch having a lost motion actuating connection with said clutch.

2. In a hoist mechanism of the character described, the combination with the pivotal load-box of a motor dump truck, of a hoist mechanism for said load-box, a clutch controlling said hoist mechanism, a brake associated with said mechanism, a rock-shaft, a clutch arm journaled on said shaft and engaging said clutch, a rock arm on said shaft having a lost motion actuating connection with said clutch arm, and a common control lever for actuating said brake and said rock arm.

3. In a hoist mechanism, the combination with the frame and pivotal load-box of a motor dump truck, of a standard mounted on said frame and having the gear case integral with the base thereof, a cross arm having a pulley at each end thereof and centrally mounted on said standard, a shaft journaled in said gear case, a drum journaled on said shaft and forming a closure for said gear case, gearing in said case for transmitting motion from said shaft to said drum, a cable carried upon said pulleys and attached at its ends to said load box and engaged intermediate its ends with said drum to wind thereon, and means for establishing a drive connection with said shaft.

In testimony whereof I sign this specification.

HARRY F. RIOPELLE.